(12) United States Patent
Hiratsuka et al.

(10) Patent No.: US 9,985,282 B2
(45) Date of Patent: *May 29, 2018

(54) POSITIVE ELECTRODE ACTIVE MATERIAL FOR NON-AQUEOUS ELECTROLYTE SECONDARY BATTERY AND NON-AQUEOUS ELECTROLYTE SECONDARY BATTERY

(71) Applicant: PANASONIC CORPORATION, Osaka (JP)

(72) Inventors: Hidekazu Hiratsuka, Osaka (JP); Akihiro Maeda, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 5 days.

This patent is subject to a terminal disclaimer.

(21) Appl. No.: 15/600,188

(22) Filed: May 19, 2017

(65) Prior Publication Data

US 2017/0256790 A1    Sep. 7, 2017

Related U.S. Application Data

(63) Continuation of application No. 14/601,457, filed on Jan. 21, 2015, now Pat. No. 9,692,047.

(30) Foreign Application Priority Data

Jan. 31, 2014 (JP) ................................ 2014-017126

(51) Int. Cl.
*H01M 4/36* (2006.01)
*H01M 4/48* (2010.01)
(Continued)

(52) U.S. Cl.
CPC ........... *H01M 4/364* (2013.01); *H01M 4/483* (2013.01); *H01M 4/485* (2013.01); *H01M 4/505* (2013.01);
(Continued)

(58) Field of Classification Search
None
See application file for complete search history.

(56) References Cited

U.S. PATENT DOCUMENTS

2001/0036578 A1  11/2001  Nishida et al.
2002/0142222 A1  10/2002  Nishida et al.
(Continued)

FOREIGN PATENT DOCUMENTS

JP  10-308218  11/1998
JP  2004-220897 A  8/2004
(Continued)

OTHER PUBLICATIONS

Non-Final Office Action issued in U.S. Appl. No. 14/962,986, dated Jan. 5, 2017.
(Continued)

*Primary Examiner* — Jonathan G Leong
*Assistant Examiner* — Christopher P Domone
(74) *Attorney, Agent, or Firm* — McDermott Will & Emery LLP

(57) ABSTRACT

A positive electrode active material for a non-aqueous electrolyte secondary battery according to an example of an embodiment of the present disclosure includes a lithium composite oxide as a main component. The ratio of a number of moles of Ni in the lithium composite oxide to a total number of moles of metal elements in the lithium composite oxide other than Li is larger than 30 mol %. The lithium composite oxide includes particles each including aggregated primary particles having a volumetric average particle size of 0.5 μm or more and at least one element selected from W, Mo, Nb, and Ta is dissolved in the lithium composite oxide.

8 Claims, 5 Drawing Sheets

(51) Int. Cl.
  *H01M 4/485* (2010.01)
  *H01M 4/505* (2010.01)
  *H01M 4/525* (2010.01)
  *H01M 4/04* (2006.01)
  *H01M 4/1391* (2010.01)
  *H01M 10/0525* (2010.01)

(52) U.S. Cl.
  CPC .......... *H01M 4/525* (2013.01); *H01M 4/0409* (2013.01); *H01M 4/1391* (2013.01); *H01M 10/0525* (2013.01)

(56) References Cited

U.S. PATENT DOCUMENTS

| | | | |
|---|---|---|---|
| 2003/0129495 A1* | 7/2003 | Yamato | C01G 41/00 429/231.1 |
| 2005/0220700 A1 | 10/2005 | Suhara et al. | |
| 2005/0271944 A1 | 12/2005 | Suhara et al. | |
| 2009/0035659 A1 | 2/2009 | Takeuchi et al. | |
| 2009/0057137 A1 | 3/2009 | Pitts et al. | |
| 2009/0104530 A1 | 4/2009 | Shizuka et al. | |
| 2010/0173202 A1 | 7/2010 | Saito et al. | |
| 2010/0219370 A1 | 9/2010 | Nakamura et al. | |
| 2010/0248040 A1 | 9/2010 | Saito et al. | |
| 2010/0276217 A1 | 11/2010 | Sugaya et al. | |
| 2011/0171529 A1* | 7/2011 | Kono | H01M 4/0471 429/223 |
| 2011/0240913 A1 | 10/2011 | Kim et al. | |
| 2012/0135319 A1 | 5/2012 | Saito et al. | |
| 2012/0276446 A1 | 11/2012 | Kawai | |
| 2013/0078520 A1* | 3/2013 | Toya | C01G 53/00 429/223 |
| 2013/0108920 A1 | 5/2013 | Oladeji | |
| 2013/0146808 A1 | 6/2013 | Endo et al. | |
| 2013/0164605 A1 | 6/2013 | Shimura et al. | |
| 2013/0330609 A1* | 12/2013 | Sawa | H01M 4/587 429/200 |
| 2014/0079990 A1 | 3/2014 | Yanagida et al. | |
| 2015/0221934 A1 | 8/2015 | Hiratsuka et al. | |
| 2015/0243982 A1 | 8/2015 | Hiratsuka et al. | |
| 2016/0248090 A1 | 8/2016 | Maeda et al. | |

FOREIGN PATENT DOCUMENTS

| | | | |
|---|---|---|---|
| JP | 2006-310181 | A | 11/2006 |
| JP | 2007-220650 | A | 8/2007 |
| JP | 2007-257885 | A | 10/2007 |
| JP | 2008-152923 | A | 7/2008 |
| JP | 2009-032681 | A | 2/2009 |
| JP | 2010-129509 | A | 6/2010 |
| JP | 2012-238581 | A | 12/2012 |
| WO | 2004/082046 | A1 | 9/2004 |
| WO | 2009/139157 | A1 | 11/2009 |
| WO | 2012/039413 | A1 | 3/2012 |
| WO | 2012/165207 | A1 | 12/2012 |
| WO | 2012/169083 | A1 | 12/2012 |
| WO | 2014/103166 | A1 | 7/2014 |

OTHER PUBLICATIONS

Non-Final Office Action issued in U.S. Appl. No. 15/211,690, dated Dec. 29, 2016.
Specification and prosecution history of U.S. Appl. No. 15/211,690, filed Jul. 15, 2016.
Specification and prosecution history of U.S. Appl. No. 15/367,134, filed Dec. 1, 2016.
Specification and prosecution history of U.S. Appl. No. 14/424,326, filed Feb. 26, 2015.
Office Action dated Nov. 8, 2016, issued in counterpart Japanese Application No. 2014-554091. 3 pages.
Notification of Transmittal of Translation of the International Preliminary Report on Patentabililty (Form PCT/IB/338) issued in counterpart International Application No. PCT/JP2013/006977 dated Jul. 9, 2015 with Forms PCT/IB/326, PCT/IB/373 and PCT/ISA/237, with English translation. (10 pages).
Non-Final Office Action issued in related U.S. Appl. No. 14/601,457, dated Mar. 3, 2016.
Final Office Action issued in related U.S. Appl. No. 14/601,457, dated Mar. 3, 2016.
Notice of Allowance issued in related U.S. Appl. No. 14/601,457, dated Jan. 17, 2017.
Notice of Allowance issued in related U.S. Appl. No. 14/601,457, dated Mar. 22, 2017.
Final Office Action issued in U.S. Appl. No. 14/962,986, dated Jun. 30, 2017.
Final Office Action issued in U.S. Appl. No. 15/211,690, dated Jun. 15, 2017.

* cited by examiner

POSITIVE ELECTRODE ACTIVE MATERIAL FOR NON-AQUEOUS ELECTROLYTE SECONDARY BATTERY AND NON-AQUEOUS ELECTROLYTE SECONDARY BATTERY

RELATED APPLICATIONS

This application is a Continuation application of U.S. patent application Ser. No. 14/601,457, filed on Jan. 21, 2015, now U.S. Pat. No. 9,692,047 which in turn claims the benefit of Japanese Application No. 2014-017126, filed on Jan. 31, 2014, the disclosures of which Applications are incorporated by reference herein.

BACKGROUND

1. Technical Field

The present disclosure relates to a positive electrode active material for a non-aqueous electrolyte secondary battery and a non-aqueous electrolyte secondary battery.

2. Description of the Related Art

Japanese Unexamined Patent Application Publication No. 2012-238581 discloses a positive electrode active material for improving output characteristics and the like of non-aqueous electrolyte secondary batteries, in which a composite oxide of lithium and at least one element selected from W, Mo, Nb, and Ta is present near the surfaces of lithium composite oxide particles containing Ni, Co, and Mn.

Non-aqueous electrolyte secondary batteries are required to exhibit good output characteristics over a wide temperature range. However, the positive electrode active material disclosed in Japanese Unexamined Patent Application Publication No. 2012-238581 does not exhibit sufficient output characteristics especially under low-temperature conditions.

SUMMARY

An aspect of the present disclosure provides a positive electrode active material for a non-aqueous electrolyte secondary battery. The positive electrode active material includes a lithium composite oxide as a main component. A ratio of the number of moles of Ni in the lithium composite oxide to a total number of moles of metal elements in the lithium composite oxide other than Li is larger than 30 mol %. The lithium composite oxide includes particles each including aggregated primary particles having a volumetric average particle size of 0.5 µm or more. At least one element selected from W, Mo, Nb, and Ta is dissolved in the lithium composite oxide.

According to a positive electrode active material for a non-aqueous electrolyte secondary battery of the present disclosure, output characteristics of a non-aqueous electrolyte secondary battery can be improved. A positive electrode active material of the present disclosure has a higher density than positive electrode active materials of related art. Accordingly, for example, the bulk density of the positive electrode active material in the positive electrode is increased and the energy density of the non-aqueous electrolyte secondary battery is improved.

BRIEF DESCRIPTION OF THE DRAWINGS

DETAILED DESCRIPTION (Underlying Knowledge Forming Basis of the Present Disclosure A non-aqueous electrolyte secondary battery is required to exhibit good output characteristics over a wide temperature range. However, sufficient output characteristics cannot be obtained with the positive electrode active material disclosed in Japanese Unexamined Patent Application Publication No. 2012-238581 especially under low-temperature conditions. FIG. 5 is an electron microscope image of a positive electrode active material (Comparative Example 1) disclosed in Japanese Unexamined Patent Application Publication No. 2012-238581. It is clear from FIG. 5 that the positive electrode active material of the related art is formed by aggregation of primary particles having small particle size and that the particle surface is rough. Moreover, in this positive electrode active material, elements such as W and Mo localize in the vicinity of the particle surface. The inventors have found that good output characteristics can be obtained even under low-temperature conditions by using positive electrode active material particles which are formed of primary particles with large particle size and contain at least one element selected from W, Mo, Nb, and Ta dissolved therein.

An example of an embodiment of the present disclosure is described below in detail.

A non-aqueous electrolyte secondary battery which is an example of an embodiment of the present disclosure includes a positive electrode, a negative electrode, and a non-aqueous electrolyte. A separator may be disposed between the positive electrode and the negative electrode. For example, a non-aqueous electrolyte secondary battery has a structure in which a positive electrode, a negative electrode, and a separator between the electrodes are wound to form a wound electrode body and the wound electrode body and a nonaqueous electrolyte are housed in an outer body. Alternatively, other forms of electrode bodies such as a laminate-type electrode body constituted by a positive electrode and a negative electrode stacked on top of each other with a separator therebetween may be employed instead of the wound electrode body. The form of the non-aqueous electrolyte secondary battery is not particularly limited and may be a cylindrical type, a prismatic type, a coin type, a button type, a laminate type, or the like.

Positive Electrode

A positive electrode includes, for example, a positive electrode current collector such as a metal foil and a positive electrode active material layer formed on the positive electrode current collector. A foil of a metal, such as aluminum, that is stable in the potential range of the positive electrode or a film having a surface layer composed of such a metal can be used as the positive electrode current collector, for example. The positive electrode active material layer may contain an electroconductive material and a binder in addition to the positive electrode active material. Positive electrode active material particles 10 described below are used as the positive electrode active material.

The electroconductive material is used to increase electric conductivity of the positive electrode active material layer. Examples of the electroconductive material include carbon materials such as carbon black, acetylene black, ketjen black, and graphite. These can be used alone or in combination of two or more.

The binder is used to maintain a good contact state between the positive electrode active material and the electroconductive material and increase the binding property of the positive electrode active material and the like to the surface of the positive electrode current collector. Examples of the binder include polytetrafluoroethylene (PTFE), polyvinylidene fluoride (PVdF), and modified products of these. The binder may be used in combination with a tackifier such as carboxymethyl cellulose (CMC) or polyethylene oxide (PEO). These can be used alone or in combination.

The positive electrode active material particles 10 which are an example of an embodiment of the present disclosure will now be described in detail with reference to FIGS. 1 to 4.

Figure 1:
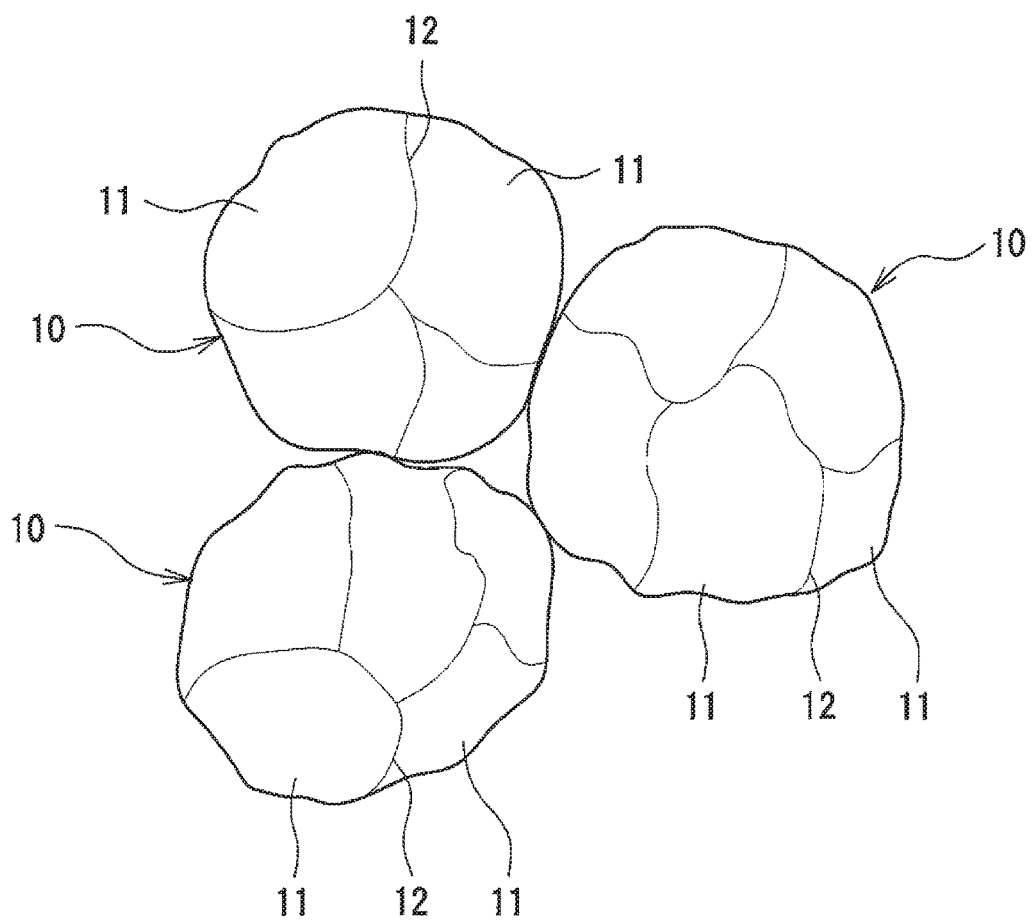
FIG. 1 is a schematic diagram of a positive electrode active material which is an example of an embodiment of the present disclosure.

FIG. 1 is a diagram schematically illustrating the positive electrode active material particles 10.

The positive electrode active material particles 10 contain, as a main component, a lithium composite oxide in which the ratio of the number of moles of Ni to the total number of moles of all metal elements other than Li is larger than 30 mol %. The lithium composite oxide is particles each formed by aggregation of primary particles 11 having a volumetric average particle size of 0.5 μm or more and at least one element (hereinafter referred to as an element α) selected from W, Mo, Nb, and Ta is dissolved in the lithium composite oxide. Hereinafter, the lithium composite oxide constituting the positive electrode active material particles 10 is referred to as a "composite oxide$_{10}$."

The positive electrode active material particles 10 may contain components other than the composite oxide$_{10}$ as long as the object of the present disclosure is not impaired. An example of such components is a lithium composite oxide other than the composite oxide$_{10}$. The composite oxide$_{10}$ content relative to the total weight of the positive electrode active material particles 10 is, for example, 50% by weight or more and may be 100% by weight. In this embodiment, the positive electrode active material particles 10 are composed of the composite oxide$_{10}$ alone (in such a case, the "composite oxide$_{10}$" and the "positive electrode active material particles 10" have the same meaning). Fine particles of inorganic compounds may be present on the surfaces of the positive electrode active material particles 10 (composite oxide$_{10}$). Examples of the inorganic compounds include oxides such as aluminum oxide ($Al_2O_3$) and lanthanoid-containing compounds.

The element α dissolved in the composite oxide$_{10}$ has high aggregation energy. High aggregation energy means that large force is needed to draw atoms apart and the hardness is high. Although the action mechanism of the element α is not clearly known, it is presumed that the electronic conductive property and ion conductivity of the composite oxide$_{10}$ are improved and the output characteristics of the battery are improved by having the element α dissolved in the oxide. A single element can be used as the element α or two or more elements can be used in combination as the element α. For example, Tungsten (W) and molybdenum (Mo) are used as the element α, for example, W is used as the element α.

For example, the element α content in the composite oxide$_{10}$ is 0.1 to 1% by weight, 0.2 to 0.8% by weight, 0.3 to 0.7% by weight relative to the total weight of the composite oxide$_{10}$. Good output characteristics are obtained as long as the element α content is within this range. The element α content in the composite oxide$_{10}$ can be measured by inductively coupled plasma (ICP) emission spectrophotometric analysis or X-ray photoelectron spectroscopy (XPS).

For example, the element α is dispersed and dissolved even in inner portions of the particles of the composite oxide$_{10}$, as described in detail below. For example, the element α contained in the composite oxide$_{10}$ is substantially completely dissolved in the composite oxide$_{10}$ and substantially evenly dispersed in the inner portions of the particles without localizing.

The composite oxide$_{10}$ is, for example, a composite oxide represented by general formula $Li_xNi_yM^*_zM_{(1-y-z)}O_2$ (where $0.1 \leq x \leq 1.2$, $0.3 < y < 1$, $0.01 < z < 0.2$, $M^*$ represents at least one element α, and M represents at least one metal element other than the element α). As is described in detail below, the element α is dispersed in the particles of the composite oxide$_{10}$. The Ni content y is, for example, larger than 0.3 from the viewpoints of cutting the cost and increasing the capacity.

Examples of the metal element M contained in the composite oxide$_{10}$ include Co, Mn, Mg, Zr, Al, Cr, V, Ce, Ti, Fe, K, Ga, and In. For example, at least one selected from Co and Mn is contained. From the viewpoints of cutting the cost, improving safety, etc., for example, Mn is at least contained. A example of the composite oxide$_{10}$ is $LiNi_{0.30}Mn_{0.30}Co_{0.30}W_{0.1}O_2$. One composite oxide$_{10}$ or two or more composite oxides$_{10}$ may be used.

As with known lithium-transition metal composite metal oxides ($LiCoO_2$, $LiNi_{0.33}Mn_{0.33}Co_{0.33}O_2$, and the like), the composite oxide$_{10}$ can be synthesized from a lithium raw material. However, according to a synthetic method similar to related art, lithium must be used in excess to some degree and the calcining temperature must be in the range of 700° C. to 900° C. in order to obtain a layered rock-salt phase as a stable phase. At a calcining temperature less than 700° C., crystal growth is insufficient. At a calcining temperature exceeding 900° C., Ni ions enter Li sites and site exchange (cation mixing) occurs between the Ni ions and the Li ions, possibly resulting in a distorted crystal structure and degradation of battery characteristics. As such, synthesizing the composite oxide$_{10}$ while controlling the calcining temperature is difficult compared to the cases of manufacturing a known lithium-transition metal composite metal oxide from a lithium raw material.

A method for synthesizing the composite oxide$_{10}$ is a method that includes ion-exchanging Na of a sodium-nickel composite oxide with Li, the sodium-nickel composite oxide being synthesized by calcining a mixture of a sodium raw material and a nickel raw material. After the ion exchange, the element α is added to the composite oxide and the resulting mixture is recalcined. Compared to the method for synthesizing a lithium-nickel composite oxide from a lithium material, this method enables formation of a layered rock-salt phase even when the calcining temperature and the Na content of the sodium-nickel composite oxide are varied greatly, and thus the physical properties and crystal size of the product can be controlled. In a Ni-containing composite oxide, the particle size of primary particles tends to be small and the particles have large surface roughness; however, with this method, distortion and/or collapse of the crystal structure does not occur during calcining while crystals are grown, and thus the shape of the particles can be controlled.

A method for synthesizing a sodium-nickel composite oxide is as follows.

At least one elected from metallic sodium and sodium compounds is used as the sodium raw material. The sodium compounds may be any compounds containing Na. Examples of the sodium raw material include oxides such as $Na_2O$ and $Na_2O_2$, salts such as $Na_2CO_3$ and $NaNO_3$, and hydroxides such as NaOH.

The nickel raw material may be any compound containing Ni. Examples thereof include oxides such as $Ni_3O_4$, $Ni_2O_3$, and $NiO_2$, salts such as $NiCO_3$ and $NiCl_2$, hydroxides such as $Ni(OH)_2$, and oxyhydroxides such as NiOOH.

The mixture ratios of the sodium raw material and the nickel raw material are, for example, set so that a layered rock salt-type crystal structure is generated. Specifically, the sodium content z in general formula $Na_zNiO_2$ is, for example, 0.5 to 2, for example, 0.8 to 1.5, and, for example, 1. For example, the two raw materials are mixed so that the chemical composition $NaNiO_2$ is achieved. The mixing method may be any method that can mix these materials evenly. An example of the mixing method is mixing with a known mixing machine such as a mixer.

The mixture of the sodium raw material and the nickel raw material is calcined in air or in an oxygen stream. The calcining temperature is, for example, 600° C. to 1100° C. and, for example, 700° C. to 1000° C. The calcining time is, for example, 1 to 50 hours if the calcining temperature is 600° C. to 1100° C., and is, for example, 1 to 10 hours if the calcining temperature is 900° C. to 1000° C. The calcined material is, for example, pulverized by a known method. As a result, a sodium-nickel composite oxide is obtained.

The ion exchange method for the sodium-nickel composite oxide is as follows.

An example of a method for ion-exchanging Na with Li is a method in which a molten salt of a lithium salt is added to a sodium-transition metal composite oxide and the mixture is heated. At least one selected from lithium nitrate, lithium sulfate, lithium chloride, lithium carbonate, lithium hydroxide, lithium iodide, and lithium bromide is, for example, used as the lithium salt. The heating temperature during the ion exchange treatment is, for example, 200° C. to 400° C. and, for example, 330° C. to 380° C. The treatment time is, for example, 2 to 20 hours and, for example, 5 to 15 hours.

A method that includes immersing a sodium-containing transition metal oxide in a solution containing at least one lithium salt is also suitable as the ion exchange treatment method. In this method, a sodium-transition metal composite oxide is placed in an organic solvent in which a lithium compound is dissolved and the resulting mixture is treated at a temperature equal to or lower than the boiling temperature of the organic solvent. For example, the ion exchange treatment is conducted while refluxing the solvent at about the boiling temperature of the organic solvent so as to increase the ion exchange speed. The treatment temperature is, for example, 100° C. to 200° C. and, for example, 140° C. to 180° C. The treatment time differs depending on the treatment temperature but is, for example, 5 to 50 hours and, for example, 10 to 20 hours.

A lithium-nickel composite oxide prepared by the ion exchange described above may contain a particular amount of Na remaining due to incomplete ion exchange. In such a case, the lithium-nickel composite oxide is, for example, represented by general formula $Li_{xu}Na_{x(1-u)}Ni_yM^*_zM_{(1-y-z)}O_2$ ($0.1 \leq x \leq 1.2$, $0.3 < y < 1$, $0.01 < z < 0.2$, and $0.95 < u \leq 1$). In the formula, u represents the exchange rate of ion-exchanging Na with Li.

Next, the element α is added to the lithium-nickel composite oxide and the resulting mixture is recalcined. As a result, a composite oxide$_{10}$ in which the element α is diffused and dissolved in the inner portions of particles is obtained. The lithium-nickel composite oxide is particles formed by aggregation of primary particles 11 having a volumetric average particle size of 0.5 μm or more. The crystallite size of the lithium-nickel composite oxide in the direction of the (110) vector is, for example, 70 to 300 nm. In other words, the physical properties such as crystallite size, surface roughness, and density, of the composite oxide$_{10}$ are practically determined before the step of dissolving the element α although there may be some instances where the crystallite size may increase to some extent in the dissolving step.

The element α added to and mixed with the lithium-nickel composite oxide can be metallic W, Mo, Nb, or Ta, or a compound or W, Mo, Nb, or Ta. The compound is not particularly limited. The amount of the element α added is, for example, 0.1 to 1% by weight relative to the total weight of the composite oxide$_{10}$ obtained. The method for mixing the element α and the lithium-nickel composite oxide is not particularly limited as long as these can be evenly mixed. An example of the mixing method is mixing using a known mixing machine such as a mixer.

The recalcining is conducted in air or in an oxygen stream. The recalcining temperature must be lower than the first calcining temperature, in other words, lower than the temperature of calcining the mixture of a sodium raw material and a nickel raw material. The recalcining temperature is, for example, 700° C. to 1050° C. and the recalcining time is, for example, 1 to 50 hours. The element α can be caused to disperse and dissolve even in the inner portions of the particles without greatly changing, for example, crystallite size and surface roughness if recalcining is performed at a temperature 900° C. or more but less than the first calcining temperature. The recalcined material is, for example, pulverized by a known method.

The composite oxide$_{10}$ (positive electrode active material particles 10) obtained by the above-described method is secondary particles formed by aggregation of the primary particles 11 having a volumetric average particle size of 0.5 μm or more. Accordingly, the composite oxide$_{10}$ has grain boundaries 12 of the primary particles 11. Although the composite oxide$_{10}$ secondary particles may aggregate in some cases, aggregated secondary particles can be separated from each other by ultrasonic dispersing. However, ultrasonically dispersing the secondary particles does not cause the secondary particles to break down into primary particles 11.

In the composite oxide$_{10}$, the element α is, for example, substantially evenly dispersed and dissolved even in the inner portions of the particles of the composite oxide$_{10}$. When the element α is substantially evenly dissolved in the inner portions of the particles of the composite oxide$_{10}$, output characteristics of the battery are greatly improved. For example, the concentration distribution of the element α in the inner portions of the particles of the composite oxide$_{10}$ is, for example, such that the difference between the maximum amount and the minimum amount of the element α among the measurement points in the inner portions of the particles is 10% or less and, for example, 5% or less. The distribution of the element α is determined by gradually sputtering the surfaces of the particles of the composite oxide$_{10}$ and measuring the concentration of the element α at the exposed cross section of each particle by secondary ion mass spectroscopy (SIMS), time-of-flight secondary ion mass spectrometry (TOF-SIMS), electron spectroscopy for chemical analysis (ESCA), auger spectroscopy analysis, electron probe micro-analysis (EPMA), or the like.

The element α contained in the composite oxide$_{10}$ is, for example, completely dissolved in the composite oxide$_{10}$. Whether the element α is completely dissolved can be confirmed by a powder X-ray diffraction pattern obtained by powder X-ray diffraction measurement. To be more specific, the element α can be considered to have been completely dissolved if the existence of the element α is confirmed by an ICP emission spectrophotometric analysis or the like of the composite oxide$_{10}$ but no peaks (the peak intensity is very weak and at a noise level) of $Li_2WO_4$ are detected in the powder X-ray diffraction pattern of the composite oxide$_{10}$.

Figure 2:
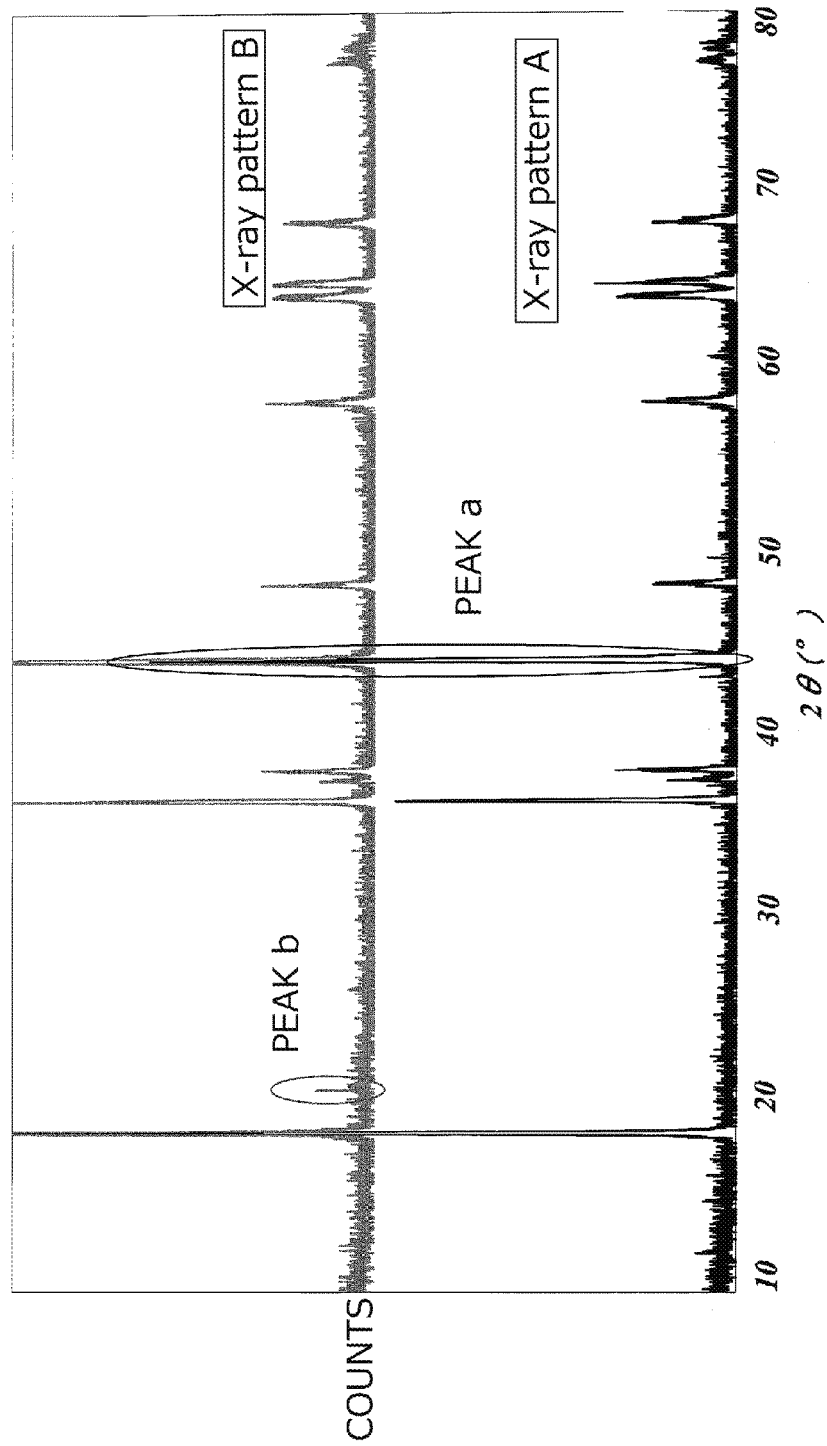
FIG. 2 is a graph that includes a powder X-ray diffraction pattern of a positive electrode active material (Example 1) which is an example of an embodiment of the present disclosure and a powder X-ray diffraction pattern of a positive electrode active material (Comparative Example 1) of related art.

FIG. 2 is a powder X-ray diffraction pattern of the composite oxide$_{10}$ (positive electrode active material particles 10).

Referring to the powder X-ray diffraction pattern (X-ray pattern A) in FIG. 2 obtained by powder X-ray diffraction measurement of the composite oxide$_{10}$ (containing W as the element α), the peak (PEAK b: Refer to X-ray pattern B) of $Li_2WO_4$ appearing at (1 2-1) plane has an intensity equal to or less than 1% of the intensity of the peak (PEAK a) of the (1 0 4) plane of the diffraction pattern. Detection of the peak of $Li_2WO_4$ means that W does not exist as a solid solution. It is found that since this peak is not detected in the composite oxide$_{10}$, W contained in the composite oxide$_{10}$ is completely dissolved. In contrast, in a powder X-ray diffraction pattern (X-ray pattern B) of a positive electrode active material of related art, a clear peak (PEAK b) of $Li_2WO_4$ appears and the intensity of this peak is far larger than 1% of the intensity of the peak (PEAK a) of the (1 0 4) plane. In other words, it is found that a large portion of W remains undissolved in the positive electrode active material of related art.

The volumetric average particle size (hereinafter referred to as "$D_{50}$") of the composite oxide$_{10}$ (secondary particles) is, for example, 5 to 30 μm, for example, 7 to 30 μm, and, for example, 10 to 30 μm. As long as $D_{50}$ is within this range, the surface roughness of the composite oxide$_{10}$ can be easily decreased and the bulk density of the composite oxide$_{10}$ in the positive electrode is improved. $D_{50}$ of the composite oxide$_{10}$ can be measured by a light diffractive scattering method. $D_{50}$ means a particle size at a volume accumulated value of 50% in a particle size distribution and is also called median size.

The volumetric average particle size of the primary particles 11 (hereinafter referred to as an "average primary particle size") constituting the composite oxide$_{10}$ is 0.5 μm or more, for example, 1 μm or more, and, for example, 2 μm or more. As long as the average primary particle size is within the above-described range, the surface roughness can be decreased while maintaining $D_{50}$ of the composite oxide$_{10}$ within an appropriate range. Each of the primary particles 11 is constituted by plural crystallites.

The average primary particle size can be evaluated by using a scanning electron microscope (SEM). A specific procedure is as follows:

(1) Select 10 particles at random from a particle image obtained by observing the composite oxide$_{10}$ with SEM (2000× magnification).

(2) Observe grain boundaries 12 and the like of the selected 10 particles and identify primary particles 11 of each particle.

(3) Determine the longest axis of each primary particle 11 and average the longest axes of the 10 primary particles to determine the average primary particle size.

The size of the crystallites of the composite oxide$_{10}$ can be expressed by a crystalline size in the (0 0 3) vector direction which is a direction in which layers in a layered rock-salt type crystal structure are stacked, and by a crystalline size in the (1 1 0) vector direction perpendicular to the (0 0 3) vector direction. The average crystallite size in the (1 1 0) vector direction is, for example, 70 to 300 nm, for example, 100 to 150 nm, and, for example, 150 to 300 nm. When the average crystallite size is within this range, the ion conductivity of the composite oxide$_{10}$ can be improved, for example.

The crystallize size is calculated by analysis involving obtaining a powder X-ray diffraction pattern of the composite oxide$_{10}$ with a powder X-ray diffraction measurement system (trade name: D8 ADVANCE produced by Bruker AXS) and analyzing the pattern by a whole powder pattern decomposition (WPPD) method.

The measurement conditions for the powder X-ray diffraction pattern are as follows:
X-ray output: 40 kV×40 mA
Detector: scintillation counter
Goniometer radius: 250 mm
Divergence slit: 0.6°
Scattering slit: 0.6°
Receiving slit: 0.1 mm
Soller slit: 2.5° (incidence side, receiving side)

The powder X-ray diffraction pattern is measured by a 2θ/θ (measuring 2θ=15° to 140° with a step width of 0.01°) method with a horizontally placed sample-type focus optical geometry. The scanning time is set so that the intensity of the main peak ((111) plane) is about 10,000 counts.

The analysis procedure of the WPPD method is as follows.

Step 1: Start software (TOPAS) and load measurement data.
Step 2: Set Emission Profile. (Select Cu tube and Bragg Brentano focus optical geometry.)
Step 3: Set Background. (Use Legendre polynomial as profile function and set the number of terms to 8 to 20.)
Step 4: Set Instrument. (Use Fundamental Parameters and input slit conditions, filament length, and sample length.)
Step 5: Set Corrections. (Use Sample Displacement and also use Absorption if the sample bulk density in the sample holder is low, in which case Absorption is fixed at a linear absorption coefficient of the measurement sample).
Step 6: Set Crystal Structure. (Set the space group to R3-m and use lattice constant, crystallite size, and lattice strain. Set the spread of the profile caused by crystallite size and lattice strain to Lorenz function).
Step 7: Execute calculation. (Refine back ground, sample displacement, diffraction intensity, lattice constant, crystallite size, and lattice strain and employ Le-ball method for calculation.)
Step 8: End analysis if the standard deviation of the crystallite size is 6% or less of the refined value. If greater than 6%, proceed to step 9.
Step 9: Set the spread of the profile caused by lattice strain to gauss function. (Keep the Lorenz function for the crystallite size.)
Step 10: Execute calculation. (Refine background, sample displacement, diffraction intensity, lattice constant, crystallite size, and lattice strain.)

Step 11: End analysis if the standard deviation of the crystallite size is 6% or less of the refined value. If greater than 6%, analysis is impossible.

Figure 3:
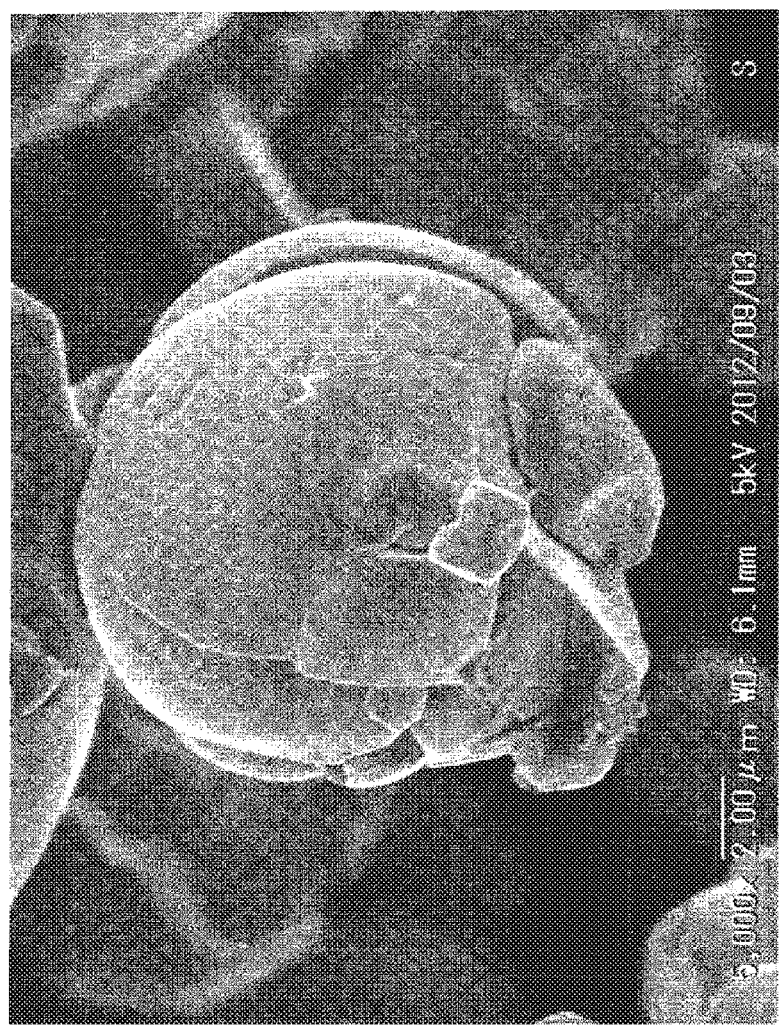
FIG. 3 is an electron microscope image of the positive electrode active material (Example 1) which is an example of an embodiment of the present disclosure.

FIG. 3 is a SEM image of the composite oxide$_{10}$ (positive electrode active material particles 10).

Figure 5:
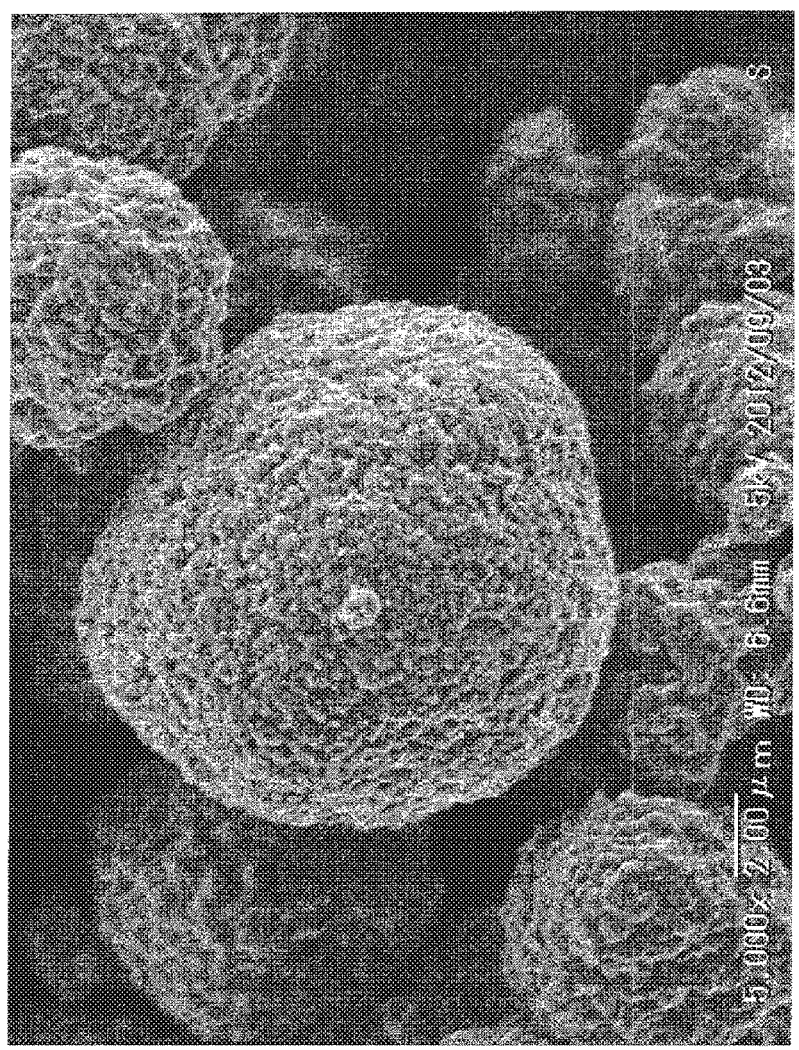
FIG. 5 is an electron microscope image of the positive electrode active material (Comparative Example 1) of related art.

Referring to FIG. 3, compared to a positive electrode active material (refer to FIG. 5) of related art, the composite oxide$_{10}$ has smooth particle surfaces and less roughness. The degree of the smoothness (roughness) of the particle surfaces can be evaluated through surface roughness measured by the method described below. The average surface roughness of the composite oxide$_{10}$ is, for example, small, in particular, for example, 4% or less and, for example, 3% or less. As long as the average surface roughness is 4% or less, the output characteristics of the battery are improved and the bulk density of the composite oxide$_{10}$ in the positive electrode is improved. The surface roughness of the composite oxide$_{10}$ is, for example, affected by the primary particle size, closeness of the primary particles 11, etc., for example.

For example, 90% or more and 95% or more of the particles of the composite oxide$_{10}$ have a surface roughness of 4% or less. In other words, the ratio of the number of particles of the composite oxide$_{10}$ having a surface roughness of 4% or less to the total number of the particles of the composite oxide$_{10}$ is, for example, 90% or more.

The average surface roughness of the composite oxide$_{10}$ is evaluated by determining the surface roughness of each particle. The surface roughness is measured for 10 particles and the results are averaged to determine the average surface roughness. The surface roughness (%) is calculated by using the following equation for calculating the surface roughness described in International Publication No. 2011/125577:

(Surface roughness)=(Maximum amount of change in particle radius r per degree)/(Length of longest axis of particle)

The particle radius r is assumed to be the distance from a center C to a point on the periphery of the particle, the center C being defined as a point that bisects the longest axis of the particle in the profile measurement described below. The amount of change in particle radius per degree is an absolute value and the "maximum amount of change" refers to the largest amount of change per degree among the amounts of change measured along the entire periphery.

Figure 4:
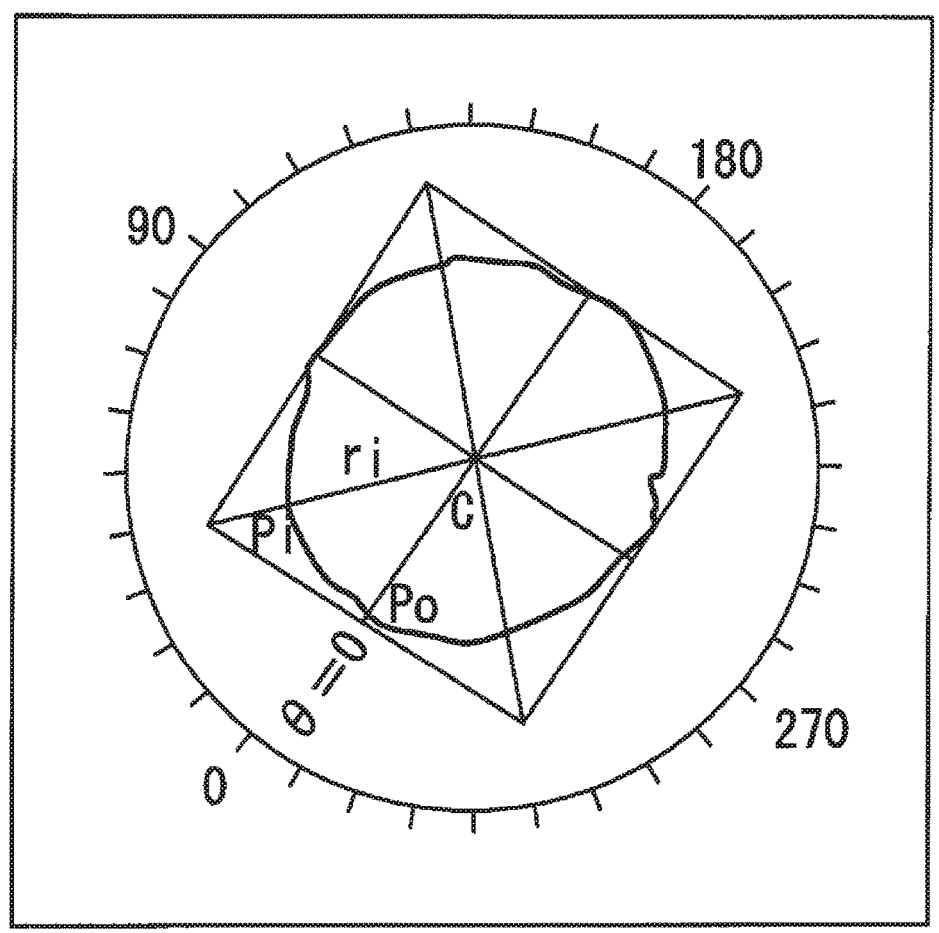
FIG. 4 is a diagram illustrating a method for measuring an average surface roughness of a positive electrode active material.

FIG. 4 illustrates a method for determining the particle radius r from a SEM image of the composite oxide$_{10}$.

Referring to FIG. 4, the distance between the center C and each of points $P_i$ on the periphery of the particle is measured and assumed to be the particle radius $r_i$. The center C is at a position that bisects the longest axis of the particle. The position on the particle periphery at which the particle radius r is the largest is assumed to be a reference point $P_0$ (θ=0). An angle formed between a line segment $CP_0$ extending from the reference point $P_0$ to the center C and a line segment $CP_i$ extending from another point $P_i$ on the particle periphery to the center C is defined as θ. Then the particle radius r was measured by changing θ in increments of 1°. The determined particle radii r are used to calculate the surface roughness from the equation described above.

The composite oxide$_{10}$ has few inner voids and is secondary particles in which primary particles 11 are closely packed. Inner voids of the composite oxide$_{10}$ are most likely to form at interfaces between the primary particles 11. However, in the composite oxide$_{10}$, the primary particles 11 of the composite oxide$_{10}$ are in close contact with each other and the porosity is low. The average porosity of the composite oxide$_{10}$ is, for example, 1% or less and more, for example, 0.5% or less. As long as the average porosity is 1% or less, the output characteristics of the battery are further improved and the bulk density of the composite oxide$_{10}$ in the positive electrode is improved. Note that the porosity of the composite oxide$_{10}$ can be determined by embedding a positive electrode active material in a resin, taking a cross section of a positive electrode active material particle by a cross-section polisher (CP) method, and observing the polished section with a SEM.

The tapped density of the composite oxide$_{10}$ is, for example, 2.7 g/mL or more and more, for example, 3.0 g/mL or more. The tapped density of the composite oxide$_{10}$ can be measured with a powder decrease rate measurement system (TPM-1 produced by Tsutsui Scientific Instruments Co., Ltd.). Specifically, 50 g of a sample (powder) is placed in a 150 mL glass graduated cylinder and tapped 1,000 times at a stroke of 30 mm by using the powder decrease rate measurement system. Then the powder bulk density is measured and assumed to be the tapped density.

The hardness of the composite oxide$_{10}$ is determined based on the closeness of the primary particles 11 constituting the secondary particles, the closeness of the crystallites constituting the primary particles 11, etc. The hardness of the composite oxide$_{10}$ can be evaluated by compressive strength of one particle. The crushing strength (St) is calculated from equation St=2.8 P/πd$^2$ (P: load on the particle, d: particle size) described in Journal of Nippon Institute of Mining and Metallurgical Engineers, vol. 81, No. 932, December 1965 issue, pp. 1024 to 1030. The crushing strength (St) is highly dependent on the particle size since it is divided by a square of the particle size. The smaller the particle, the higher the crushing strength (St). Accordingly, the crushing strength (St) is, for example, specified as a crushing strength (St) at a particular particle size.

The crushing strength (St) of one particle of the composite oxide$_{10}$ having a volume-average particle size ($D_{50}$) of 5 to 30 μm is, for example, 200 to 500 MPa and more, for example, 300 to 500 MPa. As long as the crushing strength is within this range, good cycle characteristics can be obtained even at high battery voltage.

Negative Electrode

A negative electrode includes, for example, a negative electrode current collector such as a metal foil and a negative electrode active material layer on the negative electrode current collector. A foil of a metal, such as aluminum or copper, that is stable within the potential range of the negative electrode or a film having a surface layer composed of such a metal may be used as the negative electrode current collector. For example, the negative electrode active material layer contains a binder in addition to the negative electrode active material that can occlude and release lithium ions. If needed, an electroconductive material may also be contained.

Examples of the negative electrode active material include natural graphite, artificial graphite, lithium, silicon, carbon, tin, germanium, aluminum, lead, indium, gallium, lithium alloys, carbon and silicon into which lithium is inserted in advance, and alloys and mixtures of these. As with the case of the positive electrode, PTFE or the like can be used as the binder but a styrene-butadiene copolymer (SBR) or a modified product thereof or the like is, for example, used as the binder. The binder may be used in combination with a tackifier such as CMC.

Non-Aqueous Electrolyte

A non-aqueous electrolyte contains a non-aqueous solvent and an electrolyte salt dissolved in the non-aqueous solvent. The non-aqueous electrolyte is not limited to a liquid electrolyte (non-aqueous electrolyte solution) and may be a solid electrolyte that uses a gelled polymer or the like. Examples of the non-aqueous solvent include esters, ethers, nitriles such as acetonitrile, amides such as dimethylformamide, and mixed solvents of two or more of these. The non-aqueous solvent may contain a halogen-substituted compound obtained by substituting hydrogen of any of these solvents with a halogen such as fluorine. The halogen-substituted compound is, for example, a fluorinated cyclic carbonate ester or fluorinated chain carbonate ester and is, for example, a mixture of a fluorinated cyclic carbonate ester and a fluorinated chain carbonate ester.

Examples of the esters include cyclic carbonate esters such as ethylene carbonate, propylene carbonate, and butylene carbonate, chain carbonate esters such as dimethyl carbonate, methyl ethyl carbonate, diethyl carbonate, methyl propyl carbonate, ethyl propyl carbonate, and methyl isopropyl carbonate, and carboxylate esters such as methyl acetate, ethyl acetate, propyl acetate, methyl propionate, ethyl propionate, and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ether, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

The electrolyte salt is, for example, a lithium salt. Examples of the lithium salt include $LiPF_6$, $LiBF_4$, $LiAsF_6$, $LiClO_4$, $LiCF_3SO_3$, $LiN(FSO_2)_2$, $LiN(C_lF_{2l+1}SO_2)(C_mF_{2m+1}SO_2)$ (where l and m each represent an integer of 1 or more), $LiC(C_pF_{2p+1}SO_2)(C_qF_{2q+1}SO_2)(C_rF_{2r+1}SO_2)$ (where p, q, and r each represent an integer of 1 or more), $Li[B(C_2O_4)_2]$ (lithium bis(oxalate) borate (LiBOB)), $Li[B(C_2O_4)F_2]$, $Li[P(C_2O_4)F_4]$, and $Li[P(C_2O_4)_2F_2]$. These lithium salts may be used alone or in combination of two or more.

Separator

A porous sheet having ion permeability and an insulating property is used as a separator. Specific examples of the porous sheet include a microporous thin film, woven fabric, and non-woven fabric. The material for the separator is, for example, an olefin resin such as polyethylene or polypropylene, or cellulose. The separator may be a laminate that includes a cellulose fiber layer and a thermoplastic resin fiber layer such as an olefin resin fiber layer.

EXAMPLES

The present disclosure will now be described in further detail by Examples that do not the scope of the present disclosure.

Example 1

Preparation of Positive Electrode Active Material

Sodium nitrate ($NaNO_3$), nickel(II) oxide (NiO), cobalt (II, III) oxide ($Co_3O_4$), and manganese(III) oxide ($Mn_2O_3$) were mixed to obtain $Na_{0.95}Ni_{0.33}Co_{0.33}Mn_{0.33}O_2$ (feed composition). The resulting mixture was held at a calcining temperature of 950° C. for 35 hours to obtain a sodium-nickel composite oxide.

To 5 g of the sodium-nickel composite oxide, 5 equivalents (25 g) of a molten salt prepared by mixing lithium nitrate ($LiNO_3$) and lithium hydroxide (LiOH) at a molar ratio of 61:39 was added. The resulting mixture was then held at a calcining temperature of 200° C. for 10 hours to ion-exchange Na in the sodium-nickel composite oxide with Li. The substance after the ion exchange was washed with water to obtain a lithium-nickel composite oxide.

Tungsten oxide ($WO_3$) was added to the obtained lithium-nickel composite oxide and the resulting mixture was recalcined to prepare a composite oxide in which W is diffused and dissolved even in the inner portions of the particles (hereinafter this composite oxide is referred to as a positive electrode active material A1). To the positive electrode active material A1, $WO_3$ was added so that the W content relative to the transition metal of the lithium-nickel composite oxide was 0.5 mol %. Then the mixture was recalcined by holding the mixture at 900° C. for 50 hours. The recalcined mixture was classified and particles having $D_{50}$ of 7 to 30 μm were used as the positive electrode active material A1.

The positive electrode active material A1 was analyzed by a powder X-ray diffraction method with a powder X-ray diffraction measurement system (trade name: D8 ADVANCE produced by Bruker AXS, line source: Cu—Kα) to identify the crystal structure. The crystal structure was identified to be a layered rock salt-type crystal structure. The composition of the positive electrode active material A1 was analyzed by an ICP emission spectrophotometric analyzer (trade name: iCAP 6300 produced by Thermo Fisher Scientific) and was identified to be $Li_{1.1}Ni_{0.3}Co_{0.3}Mn_{0.3}W_{0.1}O_2$.

Preparation of Positive Electrode

A mixture containing 92% by weight of the positive electrode active material A1, 5% by weight of carbon powder, and 3% by weight of polyvinylidene fluoride powder was prepared and mixed with an N-methyl-2-pyrrolidone (NMP) solution to prepare a slurry. The slurry was applied to both sides of an aluminum current collector having a thickness of 15 μm by a doctor blade method to form positive electrode active material layers. The current collector with the positive electrode active material layers was compressed with a compression roller and cut to a particular size. A positive electrode tab was attached to the cut product. As a result, a positive electrode having 30 mm short sides and 40 mm long sides was obtained.

Preparation of Negative Electrode

A mixture containing 98% by weight of the negative electrode active material, 1% by weight of a styrene-butadiene copolymer, and 1% by weight of carboxymethyl cellulose was prepared and mixed with water to prepare a slurry. A mixture of natural graphite, artificial graphite, and artificial graphite surface-coated with amorphous carbon was used as the negative electrode active material. The slurry was applied to both sides of a copper current collector having a thickness of 10 μm by a doctor blade method to form negative electrode active material layers. Then the current collector with the negative electrode active material layers was compressed with a compression roller and cut to a particular size. A negative electrode tab was attached to the cut product. As a result, a negative electrode electrode having 32 mm short sides and 42 mm long sides was obtained.

Preparation of Non-Aqueous Electrolyte Solution

In a non-aqueous solvent containing equal volumes of ethylene carbonate (EC) and diethyl carbonate (DEC), 1.6 mol/L of $LiPF_6$ was dissolved to obtain a non-aqueous electrolyte solution.

Preparation of Non-Aqueous Electrolyte Secondary Battery

A non-aqueous electrolyte secondary battery B1 was prepared by the following steps using the positive electrode, the negative electrode, the non-aqueous electrolyte solution, and the separator described above:
(1) A positive electrode and a negative electrode with a separator therebetween were wound to prepare a wound electrode body.
(2) Two insulators were respectively placed on and under the wound electrode body. The wound electrode body with the insulators was placed in a cylindrical battery package can having a diameter of 18 mm and a height of 65 mm. The battery package can was composed of steel and served as a negative electrode terminal.
(3) The negative electrode current collecting tab was welded onto an inner bottom of the battery package can and the positive electrode current collecting tab was welded onto a bottom plate of a current cut-off sealing member equipped with a safety device.
(4) The non-aqueous electrolyte solution was fed from the opening of the battery package can. The battery package can was then sealed with the current cut-off sealing member equipped with a safety valve and a current breaker to obtain a non-aqueous electrolyte secondary battery B1. The designed capacity of the non-aqueous electrolyte secondary battery B1 was 1500 mAh.

Example 2

A positive electrode active material A2 was prepared as in Example 1 except that the amount of $WO_3$ added was changed so that the W content was 0.1 mol %. A non-aqueous electrolyte secondary battery B2 was prepared as in Example 1 except that the positive electrode active material A2 was used.

Example 3

A positive electrode active material A3 was prepared as in Example 1 except that the amount of $WO_3$ added was changed so that the W content was 0.7 mol %. A non-aqueous electrolyte secondary battery B3 was prepared as in Example 1 except that the positive electrode active material A3 was used.

Example 4

A positive electrode active material A4 was prepared as in Example 1 except that the amount of $WO_3$ added was changed so that the W content was 1 mol %. A non-aqueous electrolyte secondary battery B4 was prepared as in Example 1 except that the positive electrode active material A4 was used.

Comparative Example 1

Lithium carbonate ($Li_2CO_3$), nickel(II) oxide (NiO), cobalt (II, III) oxide ($Co_3O_4$), manganese(III) oxide ($Mn_2O_3$), and tungsten oxide ($WO_3$) were mixed so that $Li_{1.1}Ni_{0.30}Co_{0.30}Mn_{0.30}W_{0.1}O_2$ (feed composition) was obtained and the W content was 0.5 mol %. The mixture was held at a calcining temperature of 950° C. for 35 hours to prepare a positive electrode active material X1. A non-aqueous electrolyte secondary battery Y1 was prepared as in Example 1 except that the positive electrode active material X1 was used.

Comparative Example 2

A positive electrode active material X2 was prepared as in Example 1 except that $WO_3$ was not added. A non-aqueous electrolyte secondary battery Y2 was prepared as in Example 1 except that the positive electrode active material X2 was used.

The concentration distribution of the element α, the dissolved state of the element α, the average primary particle size, the average crystallite size, the average surface roughness, the average porosity, the tapped density, and the crushing strength of the positive electrode active materials prepared in Examples 1 to 4 and Comparative Examples 1 and 2 were evaluated. The evaluation results are indicated in Tables 1 and 2.

Evaluation of Concentration Distribution of Element α

A measurement sample was prepared by mixing a positive electrode active material with an epoxy resin, curing the resin, cutting the cured product, and polishing the cut cured product. The sample was sputtered and surface analysis was conducted by TOF-SIMS to measure the concentration distribution of the element α in surface layers and central portions of the particles. Specifically, a sample was formed into a pellet shape and a region extending from the pellet surface to a depth of 0.3r (r denoting the particle radius of the active material) was sputtered to determine the composition of the elements contained in that region. Sputtering was continued to determine the composition of the elements contained in the region extending from a depth of 0.7r to 1r. The concentration or concentration ratio of the element α was calculated from the observed compositions.

Evaluation of Dissolved State of Element α

A powder X-ray diffraction pattern of each positive electrode active material was measured with a powder X-ray diffraction measurement system (trade name: D8 ADVANCE produced by Bruker AXS) and the peak intensity of $Li_2WO_4$ in the obtained powder X-ray diffraction pattern and the peak intensity of the (1 0 4) plane of the diffraction pattern were compared. Tungsten was considered to be completely dissolved when (peak intensity of $Li_2WO_4 \times 100$)/(peak intensity of (1 0 4) plane of positive electrode active material)≤1% (in the tables, this is indicated by circles).

Evaluation of $D_{50}$ $D_{50}$ of each positive electrode active material (secondary particle) was evaluated by using a laser diffraction/scattering particle size distribution measurement device (trade name: LA-920 produced by HORIBA Ltd.) and a dispersion medium prepared by dispersing 1 mL of a surfactant (trade name: EXTRAN MA02, neutral, produced by Merk KGAA) in 100 mL of ion exchange water. The measurement conditions were 1 min ultrasonic dispersion, ultrasonic wave intensity of 1, circulation speed of 2, and relative refractive index of 1.60-0.25.

Evaluation of Average Primary Particle Size

The procedure of measuring the average primary particle size was as follows.

Ten particles were selected at random from an image of a positive electrode active material observed with a SEM (2000× magnification). Primary particles of each of the selected ten particles were identified by observing grain boundaries, etc. The longest axis of each primary particle was determined and the average of the lengths of the longest axes of ten primary particles was assumed to be the average primary particle size.

Evaluation of Average Crystallite Size

The average crystallite size was determined by measuring a powder X-ray diffraction pattern of each positive electrode active material with a powder X-ray diffraction measurement system (trade name: D8 ADVANCE produced by Bruker AXS, line source: Cu—Kα) and analyzing the pattern by a WPPD method. The detailed analytical procedure and the like are as described above.

Evaluation of Average Surface Roughness

The surface roughness of 10 particles was determined and the average thereof was assumed to be the average surface roughness. The surface roughness (%) was calculated from the equation below:

(Surface roughness)=(Maximum amount of change in particle radius r per degree)/(Length of longest axis of particle)

The particle radius r was determined as a distance between a center C to a point on the periphery of the particle, where the center C was defined as a point that bisected the longest axis of the particle in the profile measurement described with reference to FIG. 3. The amount of change in particle radius per degree is an absolute value and the maximum amount of change was the largest amount of change per degree along the entire periphery of the particle.

Evaluation of Average Porosity

A positive electrode active material and a thermosetting resin were mixed with each other, the resin was cured to embed the positive electrode active material in the resin, and a rough cross section was taken from the cured resin by mechanical polishing and the like. The cross section was finished with a cross-section polisher (CP) method and the polished section was observed with SEM at a magnification of 1,000× to 10,000×. The porosity of the positive electrode active material was calculated from the obtained image by using analytical software of Image-Pro Plus. To be specific, voids of the secondary particles and other portions of the secondary particles were respectively rendered in black and white or white and black. The area of the each color was determined and the porosity (area ratio) was determined from the ratio between the areas. A porosity C (%) of one secondary particle was calculated from a cross-sectional area B of the secondary particle and a total cross-sectional area of all voids contained in the cross section of the secondary particle by using the equation below and the average of the porosities of 50 secondary particles selected at random was assumed to be the average porosity:

$C(\%)=(A/B)\times 100$

Evaluation of Tapped Density

Into a 150 mL glass graduated cylinder, 50 g of a positive electrode active material was placed and the tapped density was measured with a powder decrease rate measurement system (TPM-1 produced by Tsutsui Scientific Instruments Co., Ltd.). The tapped density was obtained by dividing the weight of the sample by the volume of the sample tapped 1,000 times at a stroke of 30 mm.

Evaluation of Crushing Strength

The crushing strength was measured by using a microcompression testing machine (MCT-W201 produced by Shimadzu Corporation) under the following measurement conditions. Specifically, the amount of deformation of one sample resin particle under the following loading rate and the load were measured. The load (N) applied when the sample particle deformed and reached the breaking point (the point at which the displacement starts to increase rapidly) and the particle size (particle size measured with a CCD camera) of the sample particle before deformation were substituted into the following equation to calculate the crushing strength.

Equation for Calculating Crushing Strength:

Crushing strength (MPa)=2.8×load (N)/{π×(particle size (mm))$^2$}

Crushing Strength Measurement Conditions:

Test temperature: normal temperature (25° C.)

Upper indenter: flat indenter 50 μm in diameter (material: diamond)

Lower pressure plate: SKS flat plate

Measurement mode: compression test

Test load: 10 mN minimum, 50 mN maximum

Loading rate: 0.178 mN/sec minimum, 0.221 mN/sec maximum

Displacement full scale: 10 μm

The output characteristics at low temperature (−30° C.) were evaluated for the non-aqueous electrolyte secondary batteries prepared in Examples 1 to 4 and Comparative Examples 1 and 2. The results are indicated in Tables 1 and 2.

Measurement of Low-Temperature Output Characteristics

Constant-current charging was performed in a 25° C. environment at a current density of 1 mA/cm$^2$ until a charge voltage of 4.35 V was reached and then constant-voltage charging was performed until 0.2 mA/cm$^2$. Then constant-current discharging was performed at a current density of 1 mA/cm$^2$ until 2.5 V was reached. The discharge capacity during this discharge was assumed to be the rated capacity. Charging was performed at a current density of 1 mA/cm$^2$ until 50% of the rated capacity (in other words, until the depth (state) of charge (SOC) was 50%) was reached and then the battery was left in a −30° C. atmosphere for 5 hours or longer to cool. The battery was then discharged at a current value of 5 mA/cm$^2$, 10 mA/cm$^2$, 20 mA/cm$^2$, or 30 mA/cm$^2$ for 10 seconds and the voltage on the 10th second was measured. Each time the discharging ended, a rest period of an hour was set. After the rest, the same amount of electricity as the amount used in the last discharging was charged in the same temperature environment at the same current value, and another rest period of an hour was set. As a result of this operation, the battery was adjusted so that the battery was always in a fully charged state before each discharge.

The voltage 10 seconds after the discharge was started was plotted on the vertical axis and the discharge current value was plotted on the horizontal axis to obtain a current-voltage characteristic graph. A direct current resistance (DCR) equivalent to the slope of the graph was determined and the graph was extrapolated to the current value of zero to determine the voltage $E_0$. The output W was calculated by assuming the end-of-discharge voltage value to be 2.0 V.

$V=E_0+IR$ $(R<0)$ $W=I\times V=(2.0-E_0)/R\times 2.0$

TABLE 1

|   | | Example 1 | Example 2 | Example 3 | Example 4 |
|---|---|---|---|---|---|
| A | Concentration distribution of element α | Even within the particle | Even within the particle | Even within the particle | Even within the particle |
|   | Dissolved state of element α | ○ | ○ | ○ | ○ |
|   | $D_{50}$ (μm) | 10.0 | 9.9 | 10.1 | 9.8 |
|   | Average primary particle size (μm) | 2.0 | 2.2 | 2.0 | 1.2 |
|   | Average crystallite size (nm) | 140 | 180 | 130 | 80 |
|   | Average surface roughness (%) | 2.3 | 2.1 | 2.4 | 2.9 |
|   | Average porosity (%) | 0.2 | 0.1 | 0.3 | 0.7 |
|   | Tapped density (g/mL) | 2.9 | 2.9 | 2.9 | 2.9 |
|   | Crushing strength | 250 | 300 | 240 | 200 |
| B | Low-temperature output characteristics (W) | 20 | 21 | 21 | 19 |

TABLE 2

|   | | Comparative Example 1 | Comparative Example 2 |
|---|---|---|---|
| A | Concentration distribution of element α | High concentration in surface layer | — |
|   | Dissolved state of element α | 10% | — |
|   | $D_{50}$ (μm) | 10.0 | 9.9 |
|   | Average primary particle size (μm) | 0.1 | 0.5 |
|   | Average crystallite size (nm) | 60 | 160 |
|   | Average surface roughness (%) | 6.3 | 4.9 |
|   | Average porosity (%) | 11 | 7 |
|   | Tapped density (g/mL) | 1.7 | 2.4 |
|   | Crushing strength | 70 | 100 |
| B | Low-temperature output characteristics (W) | 14 | 10 |

Tables 1 and 2 confirm that the low-temperature output characteristics of Examples 1 to 4 were 19 W or more in all cases and that Examples 1 to 4 have better characteristics than Comparative Examples 1 and 2.

Although experimental data in Examples involved cases in which W was used as the element α, the same effects are presumably obtained even when other elements, such as Mo, Nb, and Ta were used as the element α.

What is claimed is:

1. A positive electrode active material for a non-aqueous electrolyte secondary battery, comprising:
a lithium composite oxide,
wherein a ratio of a number of moles of Ni in the lithium composite oxide to a total number of moles of metal elements in the lithium composite oxide other than Li is larger than 30 mol %,
the lithium composite oxide includes secondary particles each including primary particles, the primary particles having a volumetric average particle size of 0.5 μm or more,
W is dissolved in the lithium composite oxide,
in a powder X-ray diffraction pattern obtained by performing powder X-ray diffraction measurement on the lithium composite oxide, a peak intensity of $Li_2WO_4$ is less than 1% of a peak intensity of a (1 0 4) plane in the diffraction pattern, and
the lithium composite oxide has an average crystallite size of 150 to 300 nm in a (1 1 0) vector direction.

2. The positive electrode active material according to claim 1, wherein the lithium composite oxide contains a total of 0.1 to 1% by weight of the W.

3. The positive electrode active material according to claim 1, wherein the secondary particles of the lithium composite oxide have a volumetric average particle size of 5 to 30 μm and an average surface roughness of 4% or less.

4. The positive electrode active material according to claim 1, wherein the lithium composite oxide has an average porosity of 1% or less.

5. The positive electrode active material according to claim 1, wherein the lithium composite oxide has a tapped density of 2.7 g/mL or more.

6. The positive electrode active material according to claim 1, wherein the lithium composite oxide has a crushing strength of 200 to 500 MPa.

7. The positive electrode active material according to claim 1, wherein the primary particles have a volumetric average particle size of 2 μm or more.

8. A non-aqueous electrolyte secondary battery comprising:
a positive electrode that includes the positive electrode active material according to claim 1;
a negative electrode; and
a non-aqueous electrolyte.

* * * * *